United States Patent
Tsoutsaios

(10) Patent No.: US 11,451,661 B2
(45) Date of Patent: Sep. 20, 2022

(54) METHOD FOR AUTOMATICALLY REGISTERING A USER IN A DESK-SHARE ENVIRONMENT AND IP TELEPHONE

(71) Applicant: UNIFY PATENTE GMBH & CO. KG, Munich (DE)

(72) Inventor: Antonios Tsoutsaios, Agia Paraskevi (GR)

(73) Assignee: Unify Patente GmbH & Co. KG, Munich (DE)

( * ) Notice: Subject to any disclaimer, the term of this patent is extended or adjusted under 35 U.S.C. 154(b) by 139 days.

(21) Appl. No.: 16/452,938

(22) Filed: Jun. 26, 2019

(65) Prior Publication Data

US 2020/0007600 A1   Jan. 2, 2020

(30) Foreign Application Priority Data

Jun. 29, 2018 (EP) .................................... 18180919

(51) Int. Cl.
*H04M 3/42* (2006.01)
*H04M 7/00* (2006.01)
(Continued)

(52) U.S. Cl.
CPC .... *H04M 3/42272* (2013.01); *H04L 61/5007* (2022.05); *H04M 3/42263* (2013.01);
(Continued)

(58) Field of Classification Search
CPC ......... H04M 3/42178; H04M 3/42263; H04M 3/42272; H04M 7/006; H04M 7/0075;
(Continued)

(56) References Cited

U.S. PATENT DOCUMENTS 6,577,726 B1 * 6/2003 Huang ................ H04M 3/5183
379/265.02
6,857,021 B1 * 2/2005 Schuster ........... H04M 3/42272
709/217
(Continued)

FOREIGN PATENT DOCUMENTS

EP   2077656 A2 * 7/2009 ......... H04L 61/1529
GB   2540399 A  * 1/2017 ........ H04M 3/42272
WO   03030454 A1   4/2003

*Primary Examiner* — Vivek Srivastava
*Assistant Examiner* — William C McBeth
(74) *Attorney, Agent, or Firm* — Buchanan Ingersoll & Rooney PC

(57) ABSTRACT

The present invention relates to a method for automatically registering a user in a desk-share environment comprising a plurality of desks, each desk being equipped with an IP telephone connected to a communication network, in particular, to a local area network, wherein the IP telephone holds a data base comprising data of all desk-share users of the desk-share environment, the data comprising at least a user ID and a MAC address of a terminal device for each user assigned to a user profile, the method comprising the steps of: receiving, at the IP telephone, an IP data packet from a first terminal device via the communication network; verifying the MAC address in the IP data packet received from the first terminal device; and when the MAC address corresponds to a MAC address in the data of the data base, activating the user profile assigned to the MAC address in the IP telephone. Further, the invention relates to an IP telephone which is adapted to carry out the method for automatically registering a user in a desk-share environment.

18 Claims, 6 Drawing Sheets

(51) Int. Cl.
　　*H04L 61/5007*　　(2022.01)
　　*H04L 41/08*　　(2022.01)
　　*H04L 101/622*　　(2022.01)
(52) U.S. Cl.
　　CPC ......... *H04M 7/006* (2013.01); *H04L 41/0886* (2013.01); *H04L 2101/622* (2022.05)
(58) Field of Classification Search
　　CPC ......... H04M 3/42136; H04M 3/42153; H04M 3/42229; H04L 41/08; H04L 41/0803; H04L 41/0806; H04L 41/0809; H04L 41/0816; H04L 41/0886; H04L 41/0889; H04L 67/306
　　See application file for complete search history.

(56) References Cited

U.S. PATENT DOCUMENTS

| | | | |
|---|---|---|---|
| 2004/0243701 A1* | 12/2004 | Hardwicke | H04L 41/0886 709/224 |
| 2004/0260795 A1* | 12/2004 | Gentle | H04M 3/42229 709/222 |
| 2005/0198218 A1* | 9/2005 | Tasker | H04L 41/0806 709/220 |
| 2005/0232253 A1* | 10/2005 | Ying | H04M 3/42238 370/356 |
| 2006/0039544 A1 | 2/2006 | Mulberg et al. | |
| 2008/0247523 A1 | 10/2008 | Ying et al. | |
| 2010/0061533 A1* | 3/2010 | Rice | H04M 3/42272 379/201.03 |
| 2010/0150149 A1* | 6/2010 | Morrison | H04M 3/42272 370/389 |
| 2010/0267364 A1* | 10/2010 | Smith | H04M 3/42272 455/410 |
| 2013/0343376 A1 | 12/2013 | Morrison et al. | |
| 2014/0113589 A1* | 4/2014 | Kurupacheril | H04M 1/2471 455/411 |
| 2016/0057705 A1* | 2/2016 | Schaade | H04M 3/42153 370/252 |
| 2019/0082477 A1* | 3/2019 | Burton | H04M 3/42178 |

* cited by examiner

Bob connected

Bob disconnected. Change not identified yet from the VoIP phone

Change identified via absence of traffic data from LAN port towards the VoIP phone. Phone configuration changes according to selected option.

METHOD FOR AUTOMATICALLY REGISTERING A USER IN A DESK-SHARE ENVIRONMENT AND IP TELEPHONE

FIELD OF INVENTION

The present invention relates to a method for automatically registering a user in a desk-share environment and with an IP telephone which is adapted to carry out the method for automatically registering a user in a desk-share environment.

BACKGROUND OF THE INVENTION

Desk-sharing is getting more and more popular. Desk sharing is an office concept and arrangement according to which two or more employees share the same workstation or desk in a typically pre-arranged manner that allows each of the employees to have access to the specified workstation. A desk sharing solution is, for example, favorable in cases where the employees of a firm work in shifts, because as soon as one shift is over and the employee leaves his workplace or desk, the next employee may use this workplace in the subsequent shift, so the desks or workplaces are never unused.

Usually, employees working in an office implementing the desk sharing concept share a desk and a VoIP phone device, but bring their own computer, as a notebook or a laptop computer for working at a shared desk, and it is also rather common that this computer then can be used by the employee for registering himself with an IP telephone, as a VoIP phone device, with his own credentials by entering the relevant phone menu and typing his number and his pin or code or password.

When an employee, in the following referred to as user, leaves the office and the next user takes over the desk, at first, he needs to register at the phone with his own credentials as mentioned above, namely, by entering for example his phone number, PIN, code, and/or password so that his personal data is uploaded in the phone device at the desk, as the phone number assigned to him in the company, keys that are preconfigured according to his specific requirements, or other user specific configuration features.

This registration procedure, the user has to carry out every time he wants to work at his desk in a desk sharing workplace, is time-consuming. Moreover, it bears some risks. For example, if the user forgets to register or enters wrong registration data, then he might be losing all calls directed to his own personal telephone number, or if he dials a number to call somebody, then this person will not be able to identify the caller on the basis of the telephone number alone. Moreover, there are also further functions that could be lost depending on the features used by each desk-share user. These might be, for example, calls for collective ringing groups, or calls to contact center controlled groups that the desk-share user belongs to.

Therefore, the present invention is based on the object to overcome the above described problems concerning the registration procedure at a VoIP telephone at a shared desk. In particular, the present invention is based on the object to provide a method for automatically registering a user in a desk-share environment and an IP telephone that saves the user from performing a manual error-prone registration procedure.

This object is solved according to the present invention by a method for automatically registering a user in a desk-share environment having the features set forth in the claims and an IP telephone adapted to carry out the method for automatically registering a user in a desk-share environment.

SUMMARY OF THE INVENTION

Accordingly, a method for automatically registering a user in a desk-share environment comprising a plurality of desks is provided wherein each desk is equipped with an IP telephone connected to a communication network, in particular, to a local area network, wherein the IP telephone holds a database comprising data of all desk-share users of the desk-share environment, the data comprising at least a user ID and a MAC address of a terminal device for each user assigned to a user profile, the method comprising the steps of—receiving, at the IP telephone, an IP data packet from a first terminal device via the communication network; verifying the MAC address in the IP data packet received from the first terminal device; and when the MAC address corresponds to a MAC address in the data of the database, activating the user profile assigned to the MAC address in the IP telephone.

Thus, according to the present invention, a method is provided which enables an automatic registration of a user with his own credentials at the VoIP phone at his shared desk, as soon as the user is in the office or at his shared desk, without the user having to perform any manual steps to register himself. This avoids any errors which may be encountered with the registration procedure and moreover is time saving, since the user does not have to perform the registration steps himself. The basis of the inventive method or mechanism is that each desk-share user is using a laptop computer or notebook, and that this laptop computer is connected to the company's LAN network via the VoIP phone. This is a capability that almost all VoIP phone devices offer. The VoIP phone on the shared desk, at first, provides an interface to the user (UI) to configure his phone credentials. The user enters his phone number or whatever ID is used to verify the users, his PIN, code, password, and the MAC address of his PC.

All LAN packets from the Laptop to the communication network are routed via the VoIP phone. Periodically, e.g. every 60 seconds, the phone receives packets from the user's laptop computer to identify the user that is connected to it. The user identification is effected via the MAC address of the laptop computer, which is part of the header of the IP protocol header packets that are sent from the laptop computer to the communication network and is unique for each laptop computer or other computing devices.

According to a preferred embodiment, the IP telephone periodically, e.g. every 60 seconds as mentioned above, receives IP data packets.

Advantageously, if in the step of verifying the MAC address, the IP telephone determines that the MAC address does not correspond to the MAC address of the activated user profile and is a new MAC address, then the method further comprises a step of checking, whether the new MAC address is comprised in the data; and when it is determined that the new MAC address is comprised in the data, activating the user profile assigned to the new MAC address in the IP telephone.

Preferably, the method further comprises a step of activating a default user profile, if it is determined that the new MAC address is not comprised in the data.

According to another preferred embodiment, the method further comprises a step of activating the previously activated user profile, if it is determined that the new MAC address is not comprised in the data.

According to still another preferred embodiment, the method further comprises a step of activating an emergency calls only mode, if it is determined that the new MAC address is not comprised in the data.

Moreover, it is advantageous, if the method further comprises a step of detecting a change in the periodically received data packets, in particular, detecting a stop of the data traffic received from the first terminal device.

Preferably, if a stop of the data traffic received from the first terminal device is detected by the IP telephone, then the IP telephone proceeds according to a preselected option from a number of options comprising activating a default user profile, activating an emergency calls only mode, or maintaining the activated user profile.

Further, according to the present invention, an IP telephone is provided, which is adapted to carry out the method, wherein the IP telephone is adapted to hold a database comprising data of a plurality of desk-share users of a desk-share environment, the data comprising at least a user ID and a MAC address of a terminal device for each user assigned to a user profile, the IP telephone comprising means for receiving an IP data packet from a first terminal device via the LAN, means for verifying the MAC address in the IP data packet received from the first terminal device; and— means for activating the user profile assigned to the MAC address in the IP telephone.

The IP telephone according to the present invention offers the same advantages as have already been described above with respect to the inventive method. In particular, the IP telephone according to the present invention saves a user from performing a registration process every time he starts his work shift at a shared desk.

According to a preferred embodiment, the IP telephone is a VoIP telephone.

Preferably, the IP telephone further comprises means for activating a user profile according to a predetermined time schedule.

The invention and embodiments thereof will be described below in further detail in connection with the drawings.

DESCRIPTION OF THE PREFERRED EMBODIMENTS

Figure 1:
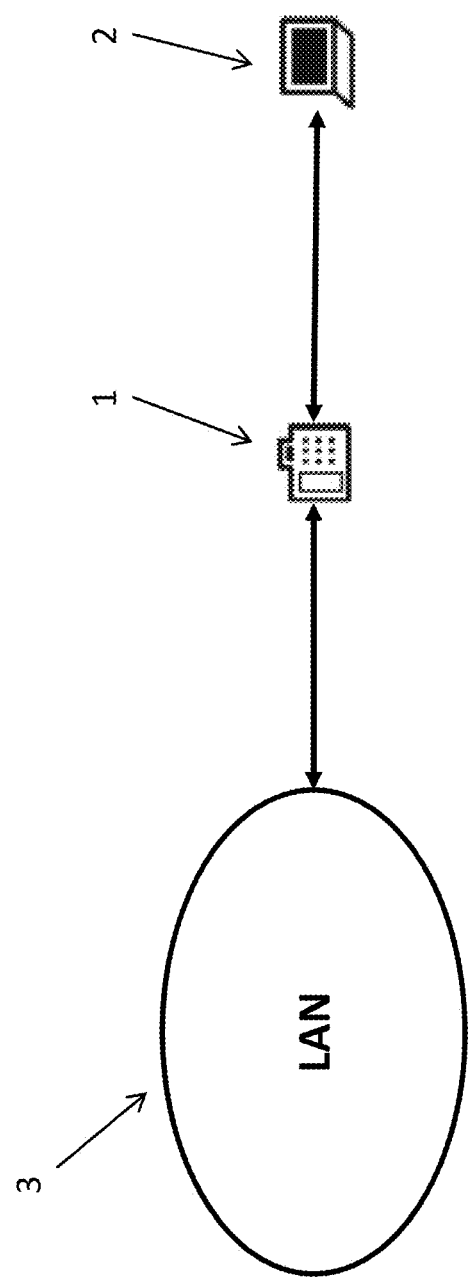
FIG. 1 schematically shows the topology for the automatic registration method according to an embodiment of the invention.

FIG. 1 schematically shows the topology for the automatic registration method according to an embodiment of the invention. As already explained above, the method is based on a concept according to which the user in a shared-desktop environment uses a desk shared with other users, the desk being equipped with an IP telephone 1, here a VoIP telephone 1, but he brings his own terminal device 2, here, in the embodiment shown, a laptop computer. This terminal device 2 is connected to a communication network 3, here in the embodiment the company's local area network (LAN) 3, via the VoIP telephone 1. This is a capability that almost all VoIP phone devices offer.

The VoIP telephone 1 provides an interface to the user (UI) to configure his phone credentials. Initially, the user enters his phone number or an ID, which can be used to verify the user, his PIN, a code, and/or a password as well as the MAC address of his terminal device 2 or laptop computer. The IP telephone has a port or ports through which the IP telephone is connected to the local area network and to a user's terminal and through which IP data packets are received. The IP telephone also contains a processor and a memory that can verify the MAC address from a terminal that is connected to the IP telephone and activate the user profile that is associated with that MAC address in a database in the IP telephone. The processor may also activate a user profile according to a schedule that is in a memory connected to the processor.

Then, all LAN packets from the laptop computer 2 to the communication network 3 are routed via the VoIP phone 2. Periodically, e.g. every 60 seconds, the VoIP phone 2 receives packets from the laptop computer 2 to identify the user that is connected to it. The user identification is effected via the MAC address of the laptop computer 2, which is part of the header of the IP protocol header packets that are sent from the laptop computer 2 to the communication network 3, and is unique for each terminal device or laptop computer 2.

Figure 2:
FIG. 2 schematically illustrates an IP packet.

FIG. 2 schematically illustrates an IP packet as received by the VoIP phone 1 in the configuration shown in FIG. 1 from the terminal device or laptop computer 2. Indicated by the black arrow is the field that contains the MAC address information for the source of the packet, namely, the terminal device or laptop computer 2.

Figure 3:
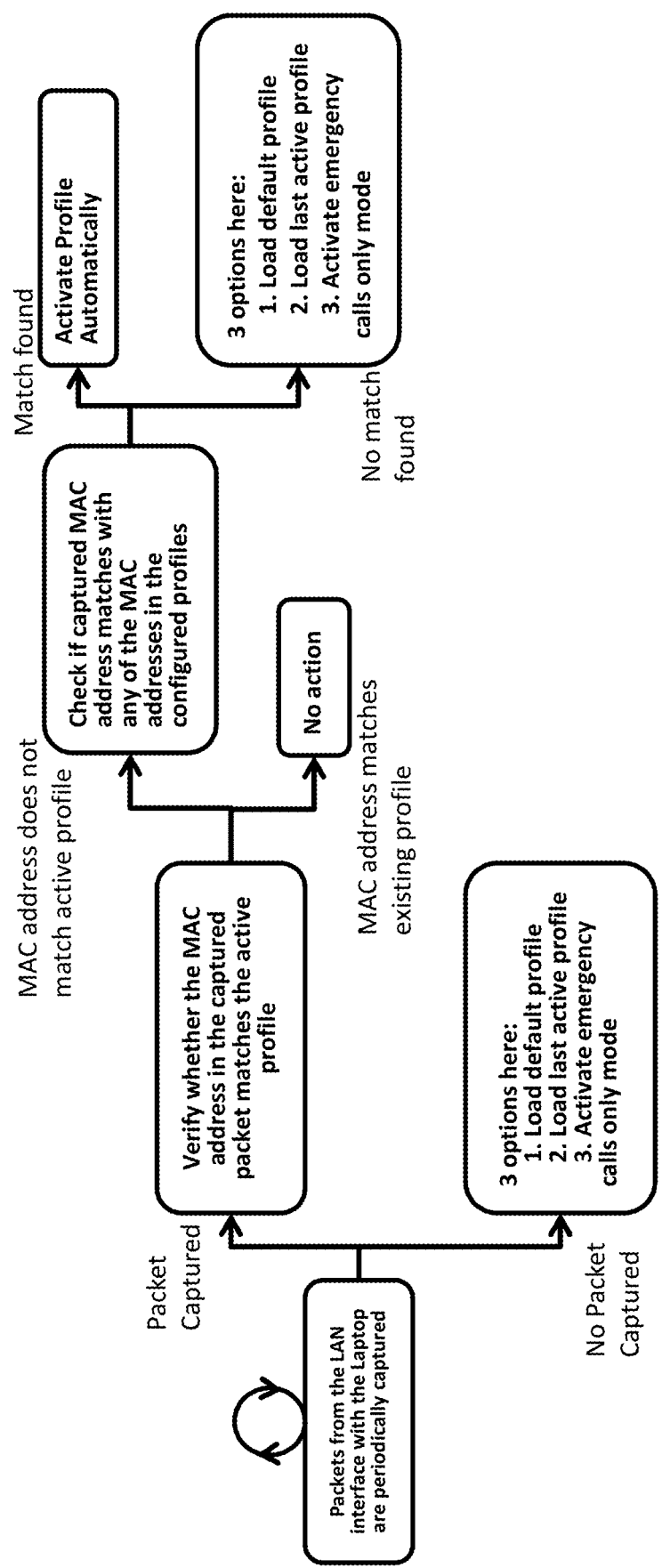
FIG. 3 shows an automatic registration procedure based on the available options according to an embodiment of the invention.

FIG. 3 shows an automatic registration procedure based on the available options according to an embodiment of the invention. The VoIP phone 1 holds a database with all data concerning the desk-share users that have configured their data, as outlined above, by entering the latter into the VoIP phone 2. Then, after a first user using a first terminal device 2 has entered an office and starts working at his shared desk, the VoIP phone 1 receives IP packets and reads, from the IP packets, the MAC address of the first terminal device 2. The VoIP phone 1 verifies if the MAC address is comprised in the data stored in the database, and if it is determined that the MAC address present in the data, the VoIP phone 1 loads the corresponding user profile of the first user to whom the identified terminal device 2 belongs. After this has been completed, the first user is able to make phone calls with his own phone number, and is able to use all functionalities assigned in his user profile, as he has configured it initially.

Then, the VoIP phone 1 periodically receives further IP packets from the terminal device 2 of the first user 1 which now is logged in, and with every received IP packet, the VoIP device 1 verifies whether the MAC address in the IP packet received still matches the MAC address assigned to the first user which currently is activated. If the VoIP phone 1 determines that a new MAC address is received, which does not match the MAC address of the first user, then the verification procedure is carried out again by checking, whether the new MAC address is comprised in the data of the database of the VoIP phone 1, and if is determined to be comprised in the database, then the new user profile assigned to the new user of the new MAC address is loaded or activated in the VoIP phone 1 automatically.

If the new MAC address cannot be found in the data of the database of the VOID phone 1, then there are the following options to take by the VOID phone 1: Option 1 is loading a default profile, option 2 is loading the last active user profile, and option 3 is activating an emergency calls only mode.

The same options are valid in the beginning of the procedure, when the VoIP phone 1 periodically receives IP packets, and the transmission of IP packets is stopped, for example, because the terminal device 2 has been disconnected. This would mean that no terminal device 2 is connected to the VoIP phone 1, and in this case, either the last valid profile is loaded, or a default profile, or no profile and the VoIP phone 2 can be used for emergency calls only.

Figure 4A:
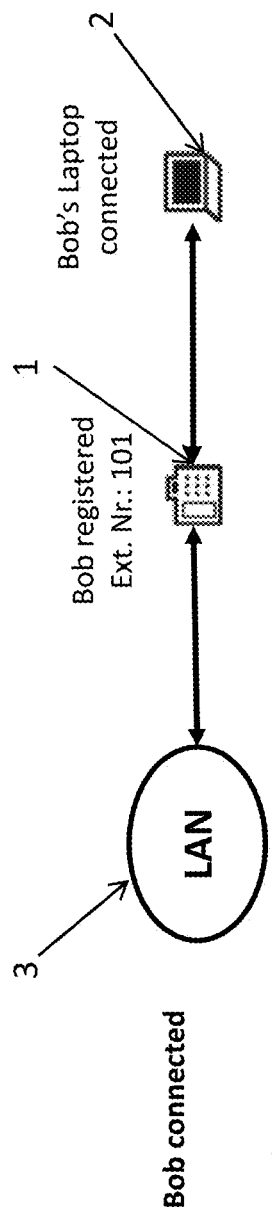
FIG. 4A to FIG. 4C illustrate a log off procedure of a user at a shared desk.
Figure 4B:
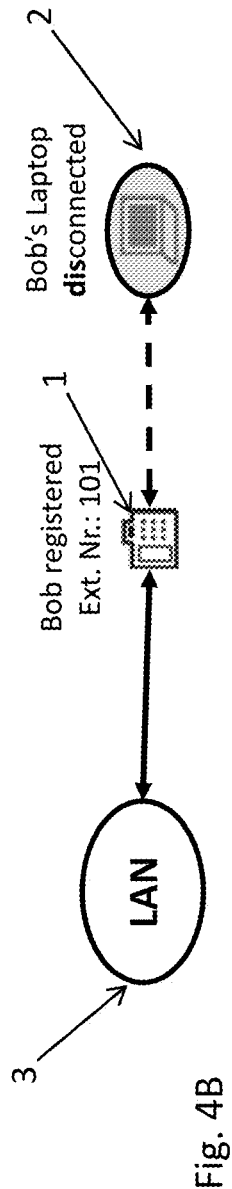
Figure 4C:
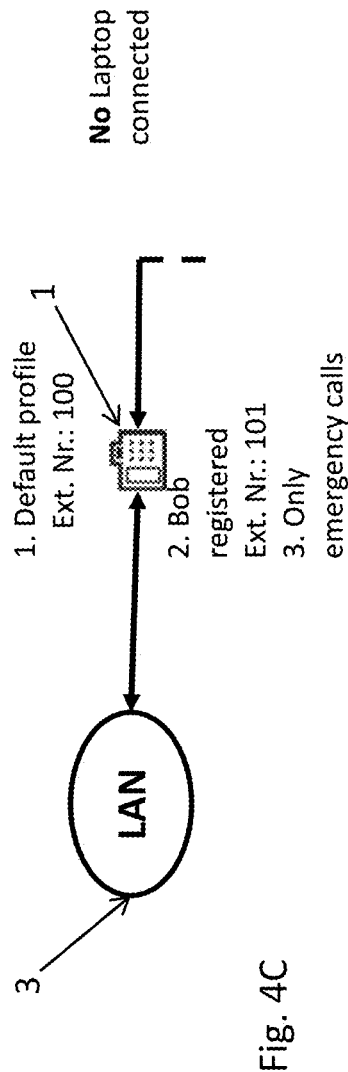

FIG. 4A, FIG. 4B, and FIG. 4C illustrate a log off procedure for a user at a shared desk. At first, in FIG. 4A, it is assumed in this scenario that as a first user, Bob is connected with his laptop computer 2 via the company's LAN 3 to a VoIP phone 1 at his shared desk. As Bob's laptop computer 2 starts sending IP packets, his MAC address is verified by the VoIP phone 1 and the latter will load Bob's user profile. In the embodiment shown here, the user profile comprises Bob's phone number, in particular, his ext. no. 101. If he makes a call, then the called person will see his phone number and will know who is calling. Also, the calls he receives are stored in his own account assigned to his user profile.

As can be seen in FIG. 4B, Bob's laptop computer 2 has been disconnected from the LAN 3, but the VoIP phone 2 is not yet aware of the disconnection. Still, Bob's user profile containing his phone extension no. 101 is active.

In FIG. 4C, the disconnection of Bob's terminal device 2 has been recognized by the VoIP phone 1, since the latter no longer receives IP packets from the terminal device 2 via the LAN 3. Upon recognition of this change, the VoIP phone 1 changes its configuration to a predetermined or selected option: option 1 would be loading a default profile with an extension no. 100, option 2 would be maintaining the last user profile, namely, Bob's user profile; and option 3 would be switching to a mode for emergency calls only.

Figure 5A:
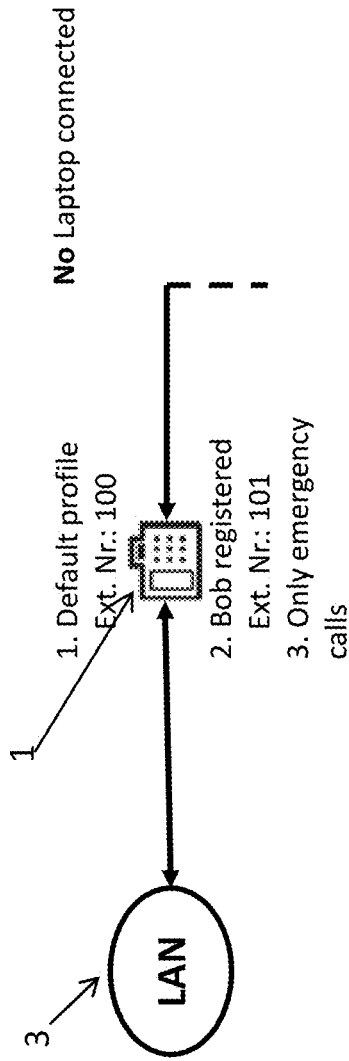
FIG. 5A to FIG. 5C illustrate the log in procedure of a new user at a shared desk.
Figure 5B:
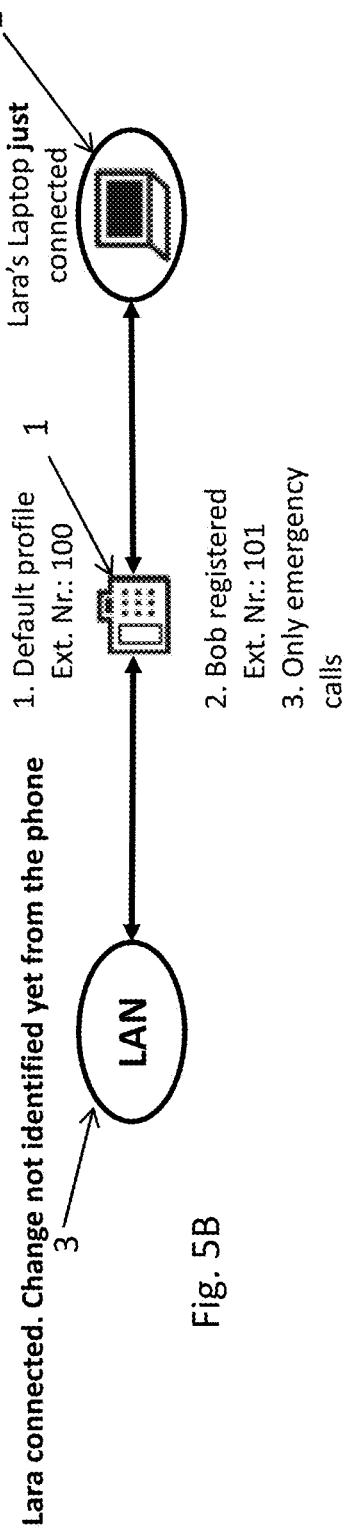
Figure 5C:
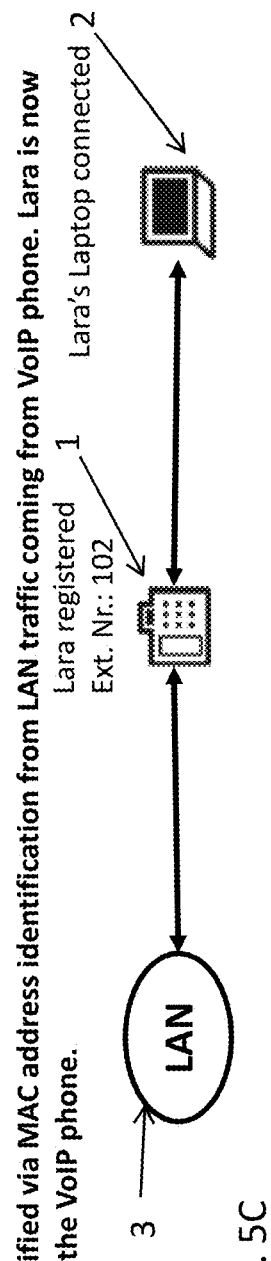

FIG. 5A to FIG. 5C illustrate the log in procedure of a new user at a shared desk. This scenario in FIG. 5A starts where the previous scenario described with respect to FIG. 4C has ended, namely, with no terminal device 2 connected via the LAN 3 to the VoIP phone 1, the latter being configured according to either one of the options 1 to 3 mentioned above.

As can be seen in FIG. 5B, a new user, Lara, has entered the office with her own terminal device 2, Lara's laptop computer, which now sends IP packets via the LAN 3 to the VoIP phone 1. However, the VoIP phone 1 has not yet realized the change, so that still the VoIP phone 1 is in the state described with respect to FIG. 5A concerning the activated profile.

In FIG. 5C, the VoIP phone 1 has identified the change as it has verified the new MAC address of the new terminal device 2 of the new user "Lara", by comparing the MAC address with MAC addresses comprised in the database. After the VoIP phone 1 has determined that the MAC address of the new terminal device 2 is present in the database, it activates the corresponding user profile assigned to this new MAC address. Now, the new user has been automatically registered at the VoIP phone 1, and the new user can use the VoIP phone 1 with its own extension number, here "102" and other functionalities, which have been configured for this user profile.

Figure 6:
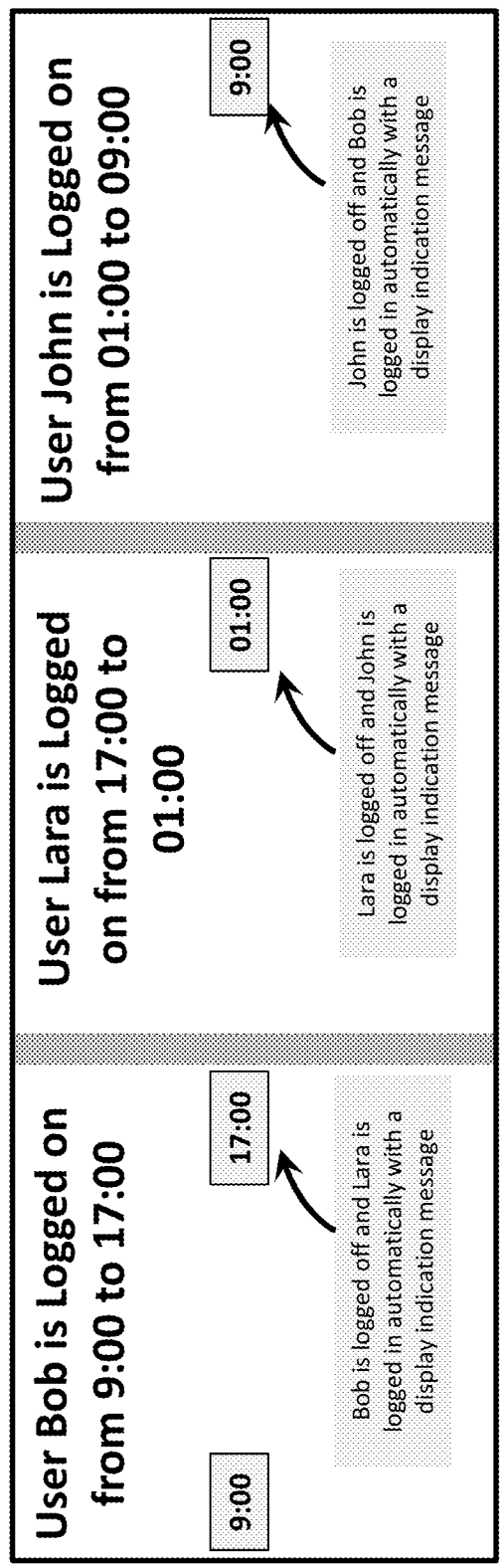
FIG. 6 shows an automatic registration process based on scheduled timeslots.

FIG. 6 shows an automatic registration process based on scheduled timeslots. This embodiment is to a more simple solution which again provides an automatic registration mechanism that is preconfigured. The phone provides again a UI, where each desk-share user selects the hours he/she will be at the office. When his/her shift ends, the system automatically logs off the referenced user and logs on the user that will use the VoIP phone 1 in the following shift. As can be seen in the figures, a first user, Bob, will be working from 9:00 o'clock AM to 17:00 o'clock PM. Thus, he will automatically be logged in at 9:00 o'clock in the morning, and will be automatically logged off at 17:00 o'clock in the afternoon. The second user, Lara, starts her shift from 7:00 o'clock and her shift ends at 01:00 o'clock in the morning. Again, the second user will be automatically logged in at the beginning of her shift, and logged off at the end of her shift. The same procedure applies with respect to the third user, who will be working from 01:00 o'clock in the morning to 9:00 o'clock in the morning.

The method according to the present invention can be utilized in any kind of VoIP desktop telephony device as long as this device acts as a gateway for the user's terminal device connection to the LAN network, and it provides an automated way to handle multiple logins from users sharing the same VoIP phone device in shifts, while it prevents a user from making errors during the registration procedure.

What is claimed is:

1. A method for automatically registering a user in a desk-share environment comprising a plurality of desks, each desk being equipped with an IP telephone connected to a communication network, the method comprising the steps of:

storing, at the IP telephone, a first user profile that includes a user identifier to verify a first user and the first user profile also including a MAC address of a first terminal device of the first user;

connecting the IP telephone to the first terminal device for connecting the first terminal device to the communication network;

the IP telephone receiving first data packets for transmission into the communication network from the first terminal device after the first terminal device is connected to the IP telephone for connection to the communication network, the first data packets comprising the MAC address of the first terminal device of the first user;

verifying, by the IP telephone, that the MAC address of the first data packets received from the first terminal device for transmission into the communication network matches the MAC address of the first terminal device included in the first user profile based on a comparison of the MAC address of the first data packets to the MAC address of the first terminal device included in the first user profile;

in response to the IP telephone determining that the MAC address of the first data packets corresponds to the MAC address of the first terminal device included in the first user profile from the comparison of the MAC address of the first data packets to the MAC address of the first terminal device included in the first user profile, the IP telephone activating the first user profile for use of the IP telephone by the first user;

the IP telephone periodically receiving second data packets for transmission into the communication network from the first terminal device; and the IP telephone verifying a MAC address of the second data packets is the MAC address of the first terminal device included in the first user profile by a comparison of the MAC address of the second data packets to the MAC address of the first terminal device included in the first user profile to maintain the first user profile being active on the IP telephone.

2. The method according to claim 1, wherein the first user profile is stored in a database of the IP telephone, the method also comprising:
    receiving, by the IP telephone, third data packets for transmission into the communication network after the second data packets are received, the third data packets having a new MAC address;
    in response to the IP telephone determining that the new MAC address of the third data packets does not correspond with the MAC address of the first terminal device included in the first user profile based on a comparison of the new MAC address of the third data packets with the MAC address of the first terminal device included in the first user profile resulting in the new MAC address not matching the MAC address of the first terminal device included in the first user profile, the IP telephone deactivating the first user profile;
    checking, by the IP telephone, whether the new MAC address is a MAC address of a second user profile of the database based on a comparison of the new MAC address of the third data packets to the MAC address of the second user profile; and
    in response to the IP telephone determining that the new MAC address is the MAC address of the second user profile stored in the database from the comparison of the new MAC address of the third data packets to the MAC address of the second user profile, the IP telephone activating the second user profile.

3. The method according to claim 1, comprising:
    receiving, by the IP telephone, third data packets for transmission into the communication network after the second data packets are received, the third data packets having a new MAC address;
    in response to the IP telephone determining that the new MAC address of the third data packets does not correspond with the MAC address of the first terminal device included in the first user profile, the IP telephone deactivating the first user profile;
    checking, by the IP telephone, whether the new MAC address is a MAC address of any second user profiles of a-database; and
    the IP telephone activating a default user profile in response to determining that the new MAC address of the third data packets is not the MAC address of any of the second user profiles.

4. The method according to claim 1, comprising:
    receiving, by the IP telephone, third data packets for transmission into the communication network after the second data packets are received, the third data packets having a new MAC address;
    in response to determining that the new MAC address of the third data packets does not correspond with the MAC address of the first terminal device that is included in the first user profile, the IP telephone deactivating the first user profile;
    checking, by the IP telephone, whether the new MAC address is a MAC address of any second user profiles of a database based on a comparison of the new MAC address of the third data packets to the MAC addresses of the second user profiles; and
    the IP telephone activating a previously activated user profile that was activated prior to the first user profile being activated in response to determining that the new MAC address is not the MAC address of any of the second user profiles of the database.

5. The method according to claim 1, comprising:
    receiving, by the IP telephone, third data packets for transmission into the communication network after the second data packets are received, the third data packets having a new MAC address;
    in response to determining that the new MAC address of the third data packets does not correspond with the MAC address of the first terminal device that is included in the first user profile, the IP telephone deactivating the first user profile;
    checking, by the IP telephone, whether the new MAC address is a MAC address of any second user profiles of a database based on a comparison of the new MAC address of the third data packets to the MAC address of the second user profiles; and
    the IP telephone activating an emergency calls only mode in response to determining that the new MAC address is not the MAC address of any of the second user profiles of the database.

6. The method according to claim 1, wherein the method further comprises a step of detecting a stop of data traffic received from the first terminal device.

7. The method according claim 6, comprising:
    in response to detecting the stop of the data traffic received from the first terminal device, the IP telephone proceeding according to a preselected option from a number of options selected from the group consisting of: activating a default user profile, activating an emergency calls only mode, and maintaining the activated first user profile.

8. The method according to claim 1 wherein the communications network is a local area network.

9. An IP telephone comprising:
    a processor connected to a non-transitory computer readable medium storing a database;
    the IP telephone configured to:
        store a first user profile in the database, the first user profile including a user identifier to verify a first user and the first user profile also including a MAC address of a first terminal device of the first user;
        communicatively connect to the first terminal device for connecting the first terminal device to a communication network;
        receive first data packets from the first terminal device for transmission into the communication network when the first terminal device is connected to the IP telephone, the first data packets comprising a MAC address of the first terminal device;
        verify that the MAC address of the first data packets received from the first terminal device matches the MAC address that is included in the first user profile based on a comparison of the MAC address of the first data packets to the MAC address of the first terminal device included in the first user profile; and
        activate the first user profile for use of the IP telephone by the first user in response to the MAC address of the first data packets corresponding to the MAC address of the first terminal device included in the first user profile determined from the comparison of the MAC address of the first data packets to the MAC address of the first terminal device included in the first user profile; and
        periodically receive second data packets from the first terminal device when the first terminal device is connected to the IP telephone to verify a MAC address of the second data packets is the MAC address of the first terminal device included in the first user profile based on a comparison of the MAC address of the second data packets to the MAC address of the first terminal device included in the first user profile to maintain the first user profile being active on the IP telephone.

10. The IP telephone according to claim 9 wherein the IP telephone is a VoIP telephone.

11. The IP telephone according to claim 9, wherein the IP telephone is also configured to activate the first user profile according to a predetermined time schedule.

12. The IP telephone of claim 9, wherein the IP telephone is configured to receive third data packets after the second data packets are received by the IP telephone and, deactivate the first user profile in response to determining that a new MAC address of the third data packets does not correspond with the MAC address of the first terminal device included in the first user profile based on a comparison of the new MAC address of the third data packets to the MAC address of the first terminal device included in the first user profile.

13. The IP telephone of claim 12, wherein the IP telephone also checks whether the new MAC address of the third data packets is a MAC address of any second user profiles stored in the database and activates a default user profile in response to determining that the new MAC address of the third data packets is not the MAC address of any of the second user profiles.

14. The IP telephone of claim 12, wherein the IP telephone also checks whether the new MAC address of the third data packets is a MAC address of any second user profiles stored in the database and activates a previously active user profile in response to determining that the new MAC address of the third data packets is not the MAC address of any of the second user profiles.

15. The IP telephone of claim 12, wherein the IP telephone also checks whether the new MAC address of the third data packets is a MAC address of any second user profiles stored in the database and activates an emergency calls only mode in response to determining that the new MAC address of the third data packets is not a MAC address of any of the second user profiles of the database.

16. The IP telephone of claim 9, wherein, in response to detecting a stop of data traffic received from the first terminal device, the IP telephone is configured to: (i) deactivate the first user profile and activate a default user profile, (ii) deactivate the first user profile and activate an emergency calls only mode, or (iii) maintain activation of the first user profile.

17. A non-transitory computer readable medium having code stored thereon, the code defining a method that is performed by a telephone when the telephone runs the code, the method comprising:

storing, at the telephone, a first user profile in a database, the first user profile including a user identifier to verify a first user and a MAC address of a first terminal device of the first user;

verifying that a MAC address of first data packets received from the first terminal device for transmission into the communication network is the MAC address of the first terminal device included in the first user profile based on a comparison of the MAC address of the first data packets to the MAC address of the first terminal device included in the first user profile;

in response to the telephone determining that the MAC address of the first data packets corresponds to the MAC address of the first user profile based on the comparison of the MAC address of the first data packets to the MAC address of the first terminal device included in the first user profile, the telephone automatically activating the first user profile for use of the telephone by the first user; and verifying a MAC address of second data packets received from the first terminal device after the first data packets are received is the MAC address of the first terminal device included in the first user profile based on a comparison of the MAC address of the second data packets to the MAC address of the first terminal device included in the first user profile to maintain the first user profile being active on the telephone.

18. The non-transitory computer readable medium of claim 17, wherein the method also comprises:

verifying a MAC address of third data packets received from the first terminal device after the second data packets are received is the MAC address of the first terminal device included in the first user profile based on a comparison of the MAC address of the third data packets to the MAC address of the first terminal device included in the first user profile to maintain the first user profile being active on the telephone, in response to the MAC address of the third data packets not corresponding to the MAC address of the first terminal device included in the first user profile being determined based on the comparison of the MAC address of the third data packets to the MAC address of the first terminal device included in the first user profile, the telephone checking whether the MAC address of the third data packets corresponds to a MAC address of any second user profiles stored in the database;

in response to the telephone determining that the MAC address of the third data packets does not correspond to the MAC address of any of the second user profiles, performing one of:

(i) deactivating the first user profile and activating a default user profile; and (ii) deactivating the first user profile and activating an emergency calls only mode.

\* \* \* \* \*